US010805150B2

United States Patent
Asghar et al.

(10) Patent No.: US 10,805,150 B2
(45) Date of Patent: Oct. 13, 2020

(54) REGENERATIVE TELEMETRY METHOD FOR RESOURCE REDUCTION

(71) Applicant: NOKIA SOLUTIONS AND NETWORKS OY, Espoo (FI)

(72) Inventors: Ahmad Asghar, Tulsa, OK (US); Bruce Cilli, Highlands, NJ (US); Bilgehan Erman, Weehawken, NJ (US); Sameerkumar Sharma, Holmdel, NJ (US); Peter Andrews, Middletown, NJ (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 122 days.

(21) Appl. No.: 16/209,093

(22) Filed: Dec. 4, 2018

(65) Prior Publication Data

US 2020/0177443 A1 Jun. 4, 2020

(51) Int. Cl.
 *G06F 15/16* (2006.01)
 *H04L 12/24* (2006.01)
 *H04L 12/26* (2006.01)
 *H04L 29/06* (2006.01)

(52) U.S. Cl.
 CPC .......... *H04L 41/0695* (2013.01); *H04L 43/02* (2013.01); *H04L 43/04* (2013.01); *H04L 43/0847* (2013.01); *H04L 43/16* (2013.01); *H04L 69/04* (2013.01)

(58) Field of Classification Search
 CPC ..... H04L 41/0695; H04L 43/02; H04L 43/04; H04L 43/0847; H04L 43/16; H04L 69/04
 See application file for complete search history.

(56) References Cited

U.S. PATENT DOCUMENTS

| 7,009,533 B1* | 3/2006 | Wegener | H04N 1/413 341/76 |
| 7,071,852 B1* | 7/2006 | Wegener | G01R 13/02 341/144 |
| 7,088,276 B1* | 8/2006 | Wegener | G06F 17/141 341/144 |
| 7,292,164 B1* | 11/2007 | Wegener | G06F 17/141 341/76 |
| 7,394,410 B1* | 7/2008 | Wegener | H03M 7/30 341/50 |

(Continued)

OTHER PUBLICATIONS

Hancu, et al., "A concurrent test architecture for massively parallel computers and its error detection capability", IEE Transactions on Parallel and Distributed Systems, vol. 5, No. 11, pp. 1169-1184. (Nov. 1994).

*Primary Examiner* — Moustafa M Meky
(74) *Attorney, Agent, or Firm* — Kramer Amado, P.C.

(57) ABSTRACT

A system and a method for interpreting normal and errored segments of network measurement data differently, and processing network measurement data, including: receiving a first query for network measurement data; extracting compressed network measurement data and error metadata from a repository database based upon the first query; decompressing the extracted compressed network measurement data; retrieving an error segment of raw network measurement data based upon the error metadata; and merging the error segment of raw network measurement data with the decompressed extracted compressed network measurement data to produce extracted network measurement data.

20 Claims, 2 Drawing Sheets

(56) References Cited

U.S. PATENT DOCUMENTS

| | | | |
|---|---|---|---|
| 7,649,484 B1 * | 1/2010 | Wegener | H03M 7/30 |
| | | | 341/155 |
| 7,876,252 B1 * | 1/2011 | Wegener | H03M 7/30 |
| | | | 341/155 |
| 2004/0064293 A1 | 4/2004 | Hamilton et al. | |
| 2007/0189176 A1 | 8/2007 | Milne et al. | |
| 2013/0097128 A1 | 4/2013 | Suzuki et al. | |
| 2013/0301890 A1 | 11/2013 | Kaempfer | |
| 2015/0365107 A1 | 12/2015 | Lee et al. | |
| 2016/0085610 A1 | 3/2016 | Mcfate et al. | |
| 2017/0097981 A1 * | 4/2017 | Kalevo | G06F 7/60 |

* cited by examiner

REGENERATIVE TELEMETRY METHOD FOR RESOURCE REDUCTION

TECHNICAL FIELD

Various exemplary embodiments disclosed herein relate generally to regenerative telemetry method for resource reduction.

BACKGROUND

Optimizing network operations and particularly network performance relies on measurements such as key performances indicators (KPI) across the network, and monitoring these measurements on regular basis based on a policy, such as at every 15 minutes. Monitoring measurements from remote nodes is referred to as telemetry in general.

The raw measurement data collected at remote network sites are typically sent to a central computing platform on regular basis for archiving and analysis.

The data generated by network equipment may indicate normal system operation or it may indicate an error condition or an anomaly. When there is an error indication, the analysis procedure triggers network operations functions to identify the reason of the error and other functions to eliminate the root cause of the error.

At the whole network level, there will always be several error indications reported by the fault management system, but the network equipment and links are designed, configured, and run in such a way that the error conditions are rare, and the network reliability stays well above 99%.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method of processing network measurement data, including: receiving a first query for network measurement data; extracting compressed network measurement data and error metadata from a repository databased based upon the first query; decompressing the extracted compressed network measurement data; retrieving an error segment of raw network measurement data based upon the error metadata; and merging the error segment of raw network measurement data with the decompressed extracted compressed network measurement data to produce extracted network measurement data.

Various embodiments are described, further including receiving, by the repository, the compressed network measurement data and the error metadata for a network object.

Various embodiments are described, further including compressing network measurement data and transmitting the compressed network measurement data to the repository.

Various embodiments are described, further including receiving, by a monitoring system, the error segment of raw network measurement data from a network object.

Various embodiments are described, further including detecting an error in the network measurement data and sending only the error segment of network measurement data to the monitoring system.

Various embodiments are described, wherein detecting the error includes filtering the network measurement data using thresholds.

Various embodiments are described, further including: receiving a second query for network measurement data; extracting compressed network measurement data and error metadata from a repository databased based upon the second query; decompressing the extracted compressed network measurement data from the second query; determining that the decompressed network measurement data from the second query has a specified accuracy; and outputting the decompressed network measurement data from the second query as the extracted network measurement data.

Further various embodiments relate to a telemetry system, including: a repository module configured to receive compressed network measurement data and error metadata; a query module configured to receive a query for network measurement data and to extract compressed network measurement data and error metadata from a repository database based upon the query; a decompression module configured to decompress the extracted compressed network measurement data; an error retrieval module configured to retrieve an error segment of raw network measurement data based upon the error metadata; and a fusion module configured to merge the error segment of raw network measurement data with the decompressed extracted compressed network measurement data.

Various embodiments are described, further including a monitoring system configured to receive the error segment of raw network measurement data from a network object.

Various embodiments are described, further including a compression module configured to compress the network measurement data and transmit the compressed network measurement data to the repository.

Various embodiments are described, further including an error detection module configured to detect an error in the network measurement data and send only the error segment of network measurement data to the monitoring system.

Various embodiments are described, wherein the error includes filtering the network measurement data using thresholds.

Various embodiments are described, further including a compression module configured to compress the network measurement data and transmit the compressed network measurement data to the repository.

Further various embodiments relate to a non-transitory machine-readable storage medium encoded with instructions for processing network measurement data, including: instructions for receiving a first query for network measurement data; instructions for extracting compressed network measurement data and error metadata from a repository databased based upon the first query; instructions for decompressing the extracted compressed network measurement data; instructions for retrieving an error segment of raw network measurement data based upon the error metadata; and instructions for merging the error segment of raw network measurement data with the decompressed extracted compressed network measurement data to produce extracted network measurement data.

Various embodiments are described, further including instructions for receiving, by the repository, the compressed network measurement data and the error metadata for a network object.

Various embodiments are described, further including instructions for compressing network measurement data and transmitting the compressed network measurement data to the repository.

Various embodiments are described, further including instructions for receiving, by a monitoring system, the error segment of raw network measurement data from a network object.

Various embodiments are described, further including instructions for detecting an error in the network measurement data and sending only the error segment of network measurement data to the monitoring system.

Various embodiments are described, wherein detecting the error includes filtering the network measurement data using thresholds.

Various embodiments are described, further including: instructions for receiving a second query for network measurement data; instructions for extracting compressed network measurement data and error metadata from a repository database based upon the second query; instructions for decompressing the extracted compressed network measurement data from the second query; instructions for determining that the decompressed network measurement data from the second query has a specified accuracy; and instructions for outputting the decompressed network measurement data from the second query as the extracted network measurement data.

Further various embodiments relate to a telemetry system, including: a repository means receiving compressed network measurement data and error metadata; a query means for receiving a query for network measurement data and to extract compressed network measurement data and error metadata from a repository database based upon the query; a decompression means for decompressing the extracted compressed network measurement data; an error retrieval means for retrieving an error segment of raw network measurement data based upon the error metadata; and a fusion means for merging the error segment of raw network measurement data with the decompressed extracted compressed network measurement data.

Various embodiments are described, further including a monitoring means for receiving the error segment of raw network measurement data from a network object.

Various embodiments are described, further including a compression means for compressing the network measurement data and transmit the compressed network measurement data to the repository.

Various embodiments are described, further including an error detection means for detecting an error in the network measurement data and sending only the error segment of network measurement data to the monitoring system.

Various embodiments are described, wherein the error includes filtering the network measurement data using thresholds.

Various embodiments are described, further including a compression for compressing the network measurement data and transmit the compressed network measurement data to the repository.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
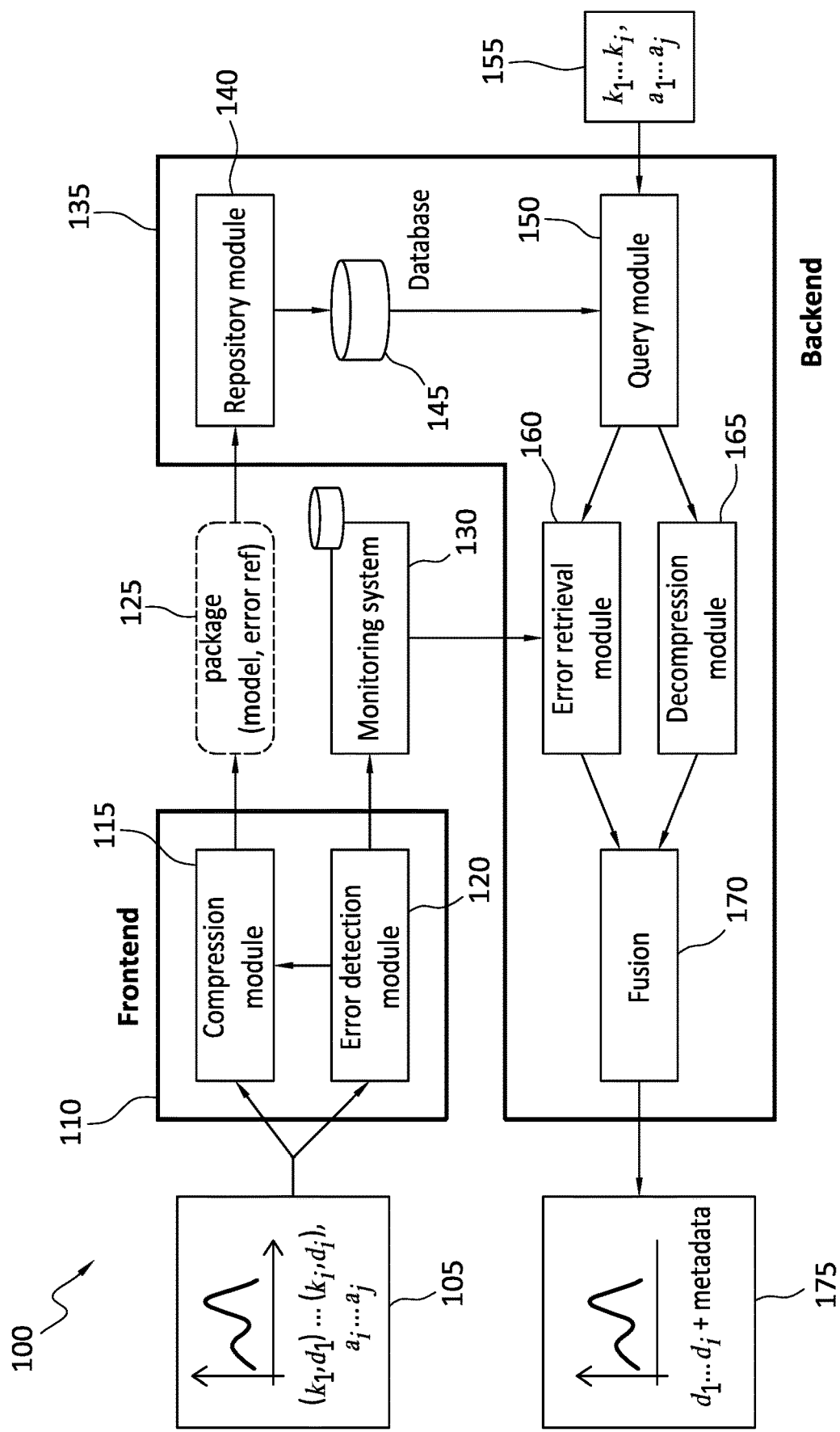
FIG. 1 illustrates the high-level architecture of an embodiment of the network telemetry system.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Many objects in the network (applications, function modules, hardware, virtual machines, communication links) continuously generate measurement data. Because there are thousands of network equipment and communication links in the network, the transmission, collection and storage of the measurement data quickly becomes unmanageable. To bound the scale of the problem, typically, the raw measurement data is summarized for 5, 15, 30, or 60 minute intervals, which results in significant loss of information.

Because of these resource constraints (for transmission of the data and storage of the data), communication systems generally do not attempt to collect highly granular measurements, such as at 1 second or 100 millisecond resolutions. On the other hand, as the industry is moving towards highly intelligent, autonomous networks with closed loop control, availability of measurement data from the network nodes in small timescales are becoming more and more critical. By using the existing solutions, it is not possible to make such large amounts of measurement data available for the cognitive control of the network.

To overcome the resource intensive scaling problem of network telemetry, existing solutions take one or more of the following approaches.

In a first approach, data is summarized over an interval, for example 5, 15, 30, or 60 minutes. This approach is an integral part of all traditional network systems. This approach results in loss of information.

In a second approach, data is compressed before being sent to a central repository. Popular monitoring systems provide the capability to work with compressed data—using lossless compression. The lossless compression ratio of highly random network data will be very small—typically less than 2:1 as compression algorithms rely on patterns and asymmetries in data symbol rates. As a result, the savings in the amount of data transmitted and stored is not as much as would be desired.

In a third approach, data is stored on the network equipment and not collected regularly. This solution will consume storage resources on the network equipment. This is not feasible in many applications such as internet of things (IoT) and other low resource situations. The solution will limit the capability to detect and resolve errors. This approach will constrain access procedures for analysis, and the data retrieval step will utilize network bandwidth.

In a fourth approach, data processing functions are pushed to the network equipment instead of pulling the data from the equipment. This approach consumes substantial compute and storage resources on the network equipment. Distributed application management of the application agents create design and operation complexity of the network equipment. Further, analysis of data from multiple network equipment becomes more complex.

In a fifth approach, using a hieratical structure, data can be collected at distributed nodes, then transferred to the central analysis unit as needed. These hieratical nodes may be network element managers or similar functional modules. In this approach, the data will not be readily available for analysis, but it must be collected from the distributed nodes upon a query. Management of the distributed nodes adds a level of complexity to the system design and operation, and the data retrieval step will utilize network bandwidth.

The embodiments of a network telemetry system described herein are based on the intuition that most of the telemetric measurement data collected in the network is part of "normal" operation of the network without errors that need to be acted on. The network telemetry system based on the invention works as follows. The network measurement data is collected at fine granularity at or within the proximity of the source node. The network measurement data is passed to a compression module and an error detection module. The error detection module analyses the timeseries of network measurement data to identify any data segments with errors. If errors are detected, the data segment of the timeseries with errors is sent to the monitoring system as raw network measurement data. If the monitoring system supports it, the data may also be sent using lossless compression. The monitoring system may be one of exiting network operations modules that stores and provides network measurement data using various pre-existing methods.

The error detection module also sends information about the error segments to the compression module as metadata. It should be noted that the error detection criteria applied at this stage is rudimentary—it is not expected to be at the level of complex anomaly detection, which is typically executed as post-processing at central computing platforms. As a result, the computing load at network elements is minimal. The compression module may apply lossy compression on the raw network measurement data passed to it for a given time interval—such as for 1 day. Then it packages the compressed network measurement data together with the metadata indicating the error segments. Then the compressing module sends the package to the central repository.

It should be noted that because lossy compression techniques are used, the amount of data sent to the repository has significant size reduction despite having randomness—which typically cannot be compressed by lossless compression algorithms.

At query time, a user requests data for a measurement interval from the query module. The query module regenerates the network measurement data by decompressing segments of compressed network measurement data retrieved from the repository.

From the metadata within the package that is retrieved from the repository, the query module checks if there were any data segments with errors in the measurement interval requested. If there were errors, then the query module accesses the monitoring system to retrieve error segments, then it overlays the error segments over the decompressed timeseries of network measurement data reconstructed from the repository. If regenerated network measurement data is accurate enough for detecting anomalies as determined by the user, then the steps for retrieving and overlaying raw network measurement data of the error segments may be eliminated. This means that the overlaying of the raw network measurement data only occurs as needed by the requirements of the user.

The user executing the query may be a network operations administrator or an autonomous cognitive module or any other autonomous system. The network measurement data archived and retrieved via this process is expected to be used for network performance optimization, business optimization, or any other high-level analytics processing.

FIG. 1 illustrates the high-level architecture of an embodiment of the network telemetry system. The telemetry system 100 has a frontend module 110 that is co-located with a network object (not shown), which produces the input network measurement data 105. The implementation of the frontend module 110 may take many forms. The frontend module 110 may be integrated with the network object as a library, or it may be integrated with the network object as a hardware element, including a general-purpose compute node within the proximity of the network object—to consume minimal network bandwidth for their interaction. If high performance is required to collect the network measurement data, then a specific hardware solution, using for example field programable gate arrays (FPGA), may be used as well. The frontend module 110 may serve one or many network objects within its vicinity.

The input network measurement data 105 at the frontend module 110 may include identifiers such as key performance indicators (KPI) ($k_i$) and auxiliary variables ($a_i$). Auxiliary variables indicate information such as the timestamp of data origination, its duration, and measurement units.

The frontend module 110 includes an error detection module 115 and the compression module 120. The error detection module 115 processes the input network measurement data 105 in real-time. If the error detection module 115 detects an error in the input network measurement data 105, then the error detection module 115 sends the segment of the input network measurement data 105 that includes the errors to a monitoring system 130. It also sends information about the error segments in the form of metadata to the compression module 110.

The error detection module maintains a first-in-first-out buffer to hold a small amount of the input network measurement data 105. When an error is detected, not only the error but also the small amount of network measurement data prior to the error is also sent to the monitoring system to provide the capability to better analyze the events leading to the error. This buffer size would be adjustable. upon the capabilities of the network object or other object implementing the frontend module 110 and the overall goals and performance requirements for anomaly detection.

The error detection 120 module is not expected to execute an elaborate anomaly detection procedure. It rather applies a broad filter on the error condition. It is expected to have simple threshold detection logic. Network operations infrastructure will typically have advanced anomaly detection applications as part of the fault management subsystem. The definition of error condition may be determined as a system level policy per KPI. However, considering the current trend where the network objects and all network equipment are becoming more advanced with substantial computing power, it is likely that the full anomaly detection algorithms may be executed at some remote network objects. Hence, the complexity of the error detection performed by the error detection module 120 will be based upon the capabilities of the network object or other object implementing the frontend module 110 and the overall goals and performance requirements for anomaly detection.

The compression module 115 collects the input network measurement data 105 for a pre-set time interval—such as for 1 day, but other intervals may be used as well. At the end of the interval, the compression module 115 performs lossy compression on the input network measurement data 105, and the frontend module 110 then packages the compressed input network measurement data and any metadata received from the error module. Then the frontend module 115 sends the package 125 to the repository module 140.

The monitoring system 130 receives and stores segments of the input network measurement data 105 that includes the errors. This data may then later be accessed by a backend module 135. The monitoring system 130 may reside on the network where it is most convenient and efficient. The monitoring system 130 may be part of a central computing platform (not shown) or it may be a stand-alone system. The monitoring system 130 may include storage for storing segments of the input network measurement data 105 that includes the errors and a controller that allows for access to the data stored.

The backend module 135 that is typically part of the central computing platform may include a repository module 140, a database 145, a query module 150, an error retrieval module 160, a decompression module 165, and a fusion module 170.

The repository module 140 typically resides at a central computing platform (not shown). The repository module 140 stores incoming data packages 125 in a database. The repository module 140 may include storage of any type and a controller that accesses the stored data packages 125.

To access the saved network data, a user enters a query 155 to the query module 150. As noted above, the user can be person (e.g., a network manager or technician) or an automated system. The query 155 includes KPI identifiers and auxiliary variables indicating the time and the duration of the data (the auxiliary variables may also include other properties such as the format of the data.) The query 155 will also identify the specific network elements for which data is requested.

The query module 150 accesses the database 145 to retrieve packages 125 corresponding to the given time interval. Then the query module 150 passes the compressed data to the decompression module 165 and checks if the metadata indicates any error segments. The query module 150 passes any error segment information included in the package 125 to the error retrieval module 160.

The decompression module 165 recovers the original network measurement data according to the identified accuracy settings and passes the decompressed data to the fusion module. The error retrieval module 160 accesses the monitoring system 130 to retrieve raw network measurement data for the error segments based upon the error segment information received from the query module 165. Then the error retrieval module passes the retrieved raw network measurement data to the fusion module 170 if there are any error segments in the given query interval.

The fusion module 170 merges together the decompressed network measurement data and the raw network measurement error data. If there are any raw network measurement error data received from the error retrieval module 160 in the duration of the decompressed data, the fusion module 170 replaces the corresponding segments of the decompressed network measurement data with the raw network measurement error data. The fusion module 170 then outputs the data as one timeseries. It also provides a metadata block that indicates to the user including the statistics of the accuracy of the compression process and the location of the error segments if any.

In another embodiment, if requested from the query module, the telemetry system 100 can trigger immediate generation and transfer of pending data (normal or error) from the frontend modules 110.

Figure 2:
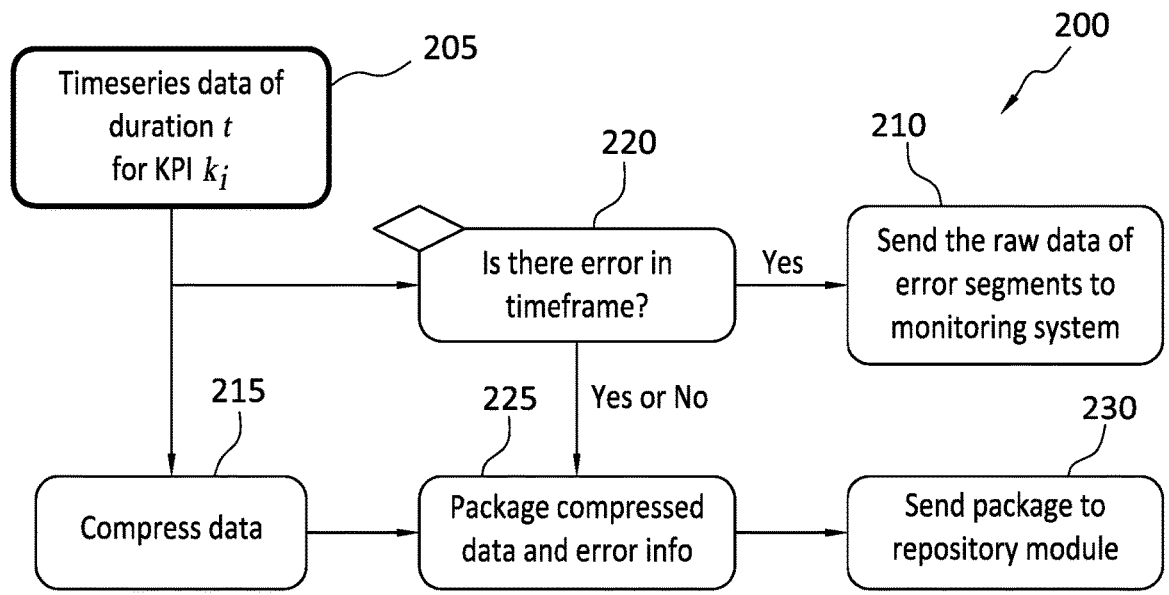
FIG. 2 illustrates a flowchart for frontend module processing of one KPI measurement.

FIG. 2 illustrates a flowchart for frontend module processing of one KPI measurement. The frontend module 110 receives input network measurement data 205 for a KPI ($k_i$) over a specific timeframe of duration t. The frontend module 110 compresses the data, step 215. The frontend module 110 also detects if there if any errors are found for the KPI during the timeframe. If an error is found in the KPI measurement, the frontend module 110 sends the raw network management data to the monitoring system 130. Also, at this point metadata indicating the presence of an error is produced and sent to be packaged with the compressed data. The frontend module 110 then packages the compressed network measurement data and the error metadata, step 225, and sends the package, step 230, to the repository module 140.

Figure 3:
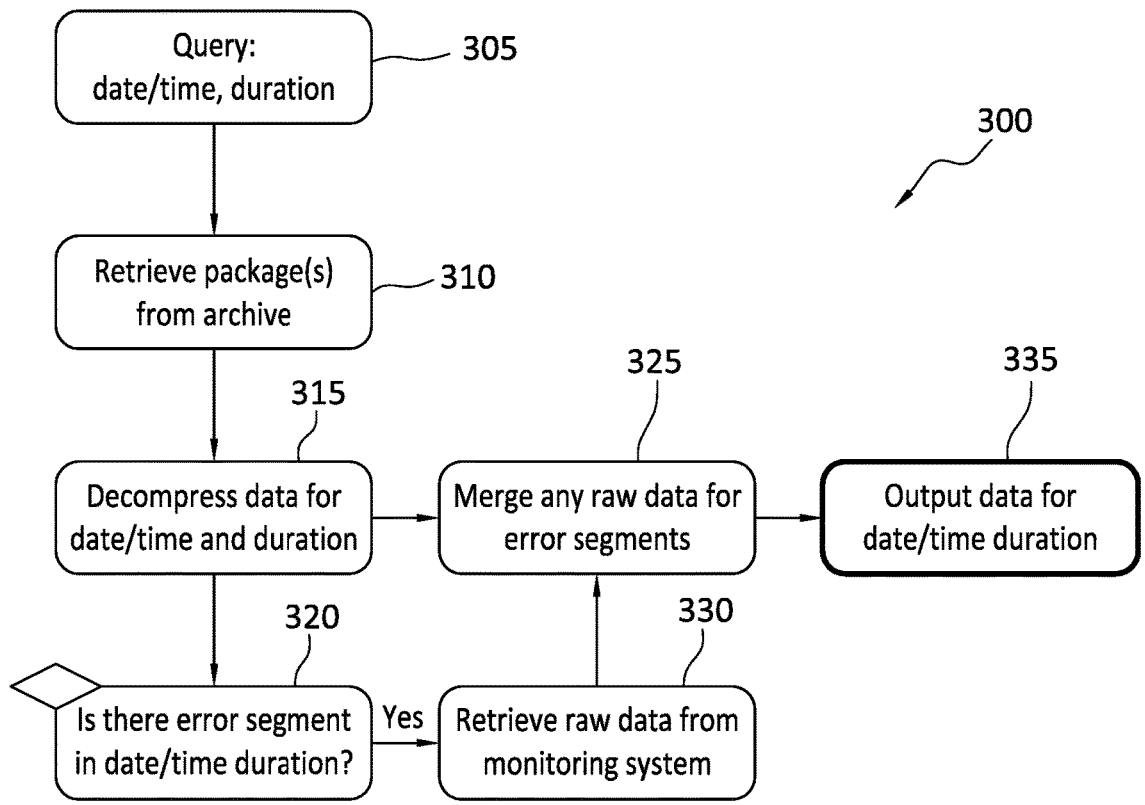
FIG. 3 illustrates a flowchart for backend module processing of one query.

FIG. 3 illustrates a flowchart for backend module processing of one query. The backend module 135 receives the query 305 which may include a timeframe including start date and time and a time duration. Further, the query may indicate the network object for which network measurement data will be searched. Next, the backend module 135 will retrieve package(s) from the database 145 corresponding to the query. The backend module 135 then decompresses the compressed network measurement data in the package. The backend module 135 also determines if there are any error segments during the query timeframe, 320, and if so, the backend module 135 retrieves, step 330, the raw network measurement data from the monitoring system 130. The backend module 135 then merges any raw network measurement data for the error segments with the decompressed network measurement data, step 325. The backend module 135 then outputs the merged output data for the query 335.

Also, as part of determining if there is any error segments during the query timeframe, step 320, the backend module 135 may determine that the accuracy of the decompressed network measurement data is accurate enough, and if so not seek to determine if there is any error segments during the query timeframe or to retrieve such data, and instead just use the decompressed data.

Embodiments of the telemetry system may use a variety of choices to apply lossy compression to the network measurement data at the frontend. One embodiment may use deep neural network. Embodiments may also use open-source tools such as ZFP, https://computation.llnl.gov/projects/floating-point-compression. The tool allows adjustment of the compression rate and the error magnitude of the output. The tool has an implementation in C++ programming language with a small footprint. It reaches compression throughput up to 2 GB/second.

The various modules described herein will be implemented using software or program instructions running on a processor. In situations, where high performance is required, specific hardware implementation of the modules may be used as well.

The embodiments described herein solve the technological problem of collecting network measurement data with enough accuracy and granularity to allow for advance network anomaly detection, and data analysis for business or operations optimization purposes. Currently, network data analysis schemes are being developed using, for example, deep neural networks, machine learning, etc., that require accurate network measurement data. As described above, to collect such data uses up a lot of data storage and/or network bandwidth. As a result, existing data collection methods may not provide the needed capacity or may result in high network and storage resource utilization. Thus, the telemetry system embodiments described herein provide a method and system that provides network measurement data with sufficient accuracy without requiring excessive storage, network bandwidth, or hardware resources.

The embodiments described herein may be implemented as software running on a processor with an associated memory and storage. The processor may be any hardware device capable of executing instructions stored in memory or storage or otherwise processing data. As such, the processor may include a microprocessor, field programmable gate array (FPGA), application-specific integrated circuit (ASIC), graphics processing units (GPU), specialized neural network processors, cloud computing systems, or other similar devices.

The memory may include various memories such as, for example L1, L2, or L3 cache or system memory. As such, the memory may include static random-access memory (SRAM), dynamic RAM (DRAM), flash memory, read only memory (ROM), or other similar memory devices.

The storage may include one or more machine-readable storage media such as read-only memory (ROM), random-access memory (RAM), magnetic disk storage media, optical storage media, flash-memory devices, or similar storage media. In various embodiments, the storage may store instructions for execution by the processor or data upon with the processor may operate. This software may implement the various embodiments described above.

Further such embodiments may be implemented on multiprocessor computer systems, distributed computer systems, and cloud computing systems. For example, the embodiments may be implemented as software on a server, a specific computer, on a cloud computing, or other computing platform.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of processing network measurement data, comprising:
receiving a first query for network measurement data;
extracting compressed network measurement data and error metadata from a repository database based upon the first query;
decompressing the extracted compressed network measurement data;
retrieving an error segment of raw network measurement data based upon the error metadata; and
merging the error segment of raw network measurement data with the decompressed extracted compressed network measurement data to produce extracted network measurement data.

2. The method of claim 1, further comprising receiving, by the repository, the compressed network measurement data and the error metadata for a network object.

3. The method of claim 2, further comprising compressing network measurement data and transmitting the compressed network measurement data to the repository.

4. The method of claim 1, further comprising receiving, by a monitoring system, the error segment of raw network measurement data from a network object.

5. The method of claim 4, further comprising detecting an error in the network measurement data and sending only the error segment of network measurement data to the monitoring system.

6. The method of claim 5, wherein detecting the error includes filtering the network measurement data using thresholds.

7. The method of claim 1, further comprising:
receiving a second query for network measurement data;
extracting compressed network measurement data and error metadata from a repository database based upon the second query;
decompressing the extracted compressed network measurement data from the second query;
determining that the decompressed network measurement data from the second query has a specified accuracy; and
outputting the decompressed network measurement data from the second query as the extracted network measurement data.

8. A telemetry system, comprising:
a repository module configured to receive compressed network measurement data and error metadata;
a query module configured to receive a query for network measurement data and to extract compressed network measurement data and error metadata from a repository database based upon the query;
a decompression module configured to decompress the extracted compressed network measurement data;
an error retrieval module configured to retrieve an error segment of raw network measurement data based upon the error metadata; and
a fusion module configured to merge the error segment of raw network measurement data with the decompressed extracted compressed network measurement data.

9. The telemetry system of claim 8, further comprising a monitoring system configured to receive the error segment of raw network measurement data from a network object.

10. The telemetry system of claim 9, further comprising a compression module configured to compress the network measurement data and transmit the compressed network measurement data to the repository.

11. The telemetry system of claim 8, further comprising an error detection module configured to detect an error in the network measurement data and send only the error segment of network measurement data to the monitoring system.

12. The telemetry system of claim 11, wherein detecting the error includes filtering the network measurement data using thresholds.

13. The telemetry system of claim 11, further comprising a compression module configured to compress the network measurement data and transmit the compressed network measurement data to the repository.

14. A non-transitory machine-readable storage medium encoded with instructions for processing network measurement data, comprising:
   instructions for receiving a first query for network measurement data;
   instructions for extracting compressed network measurement data and error metadata from a repository database based upon the first query;
   instructions for decompressing the extracted compressed network measurement data;
   instructions for retrieving an error segment of raw network measurement data based upon the error metadata; and
   instructions for merging the error segment of raw network measurement data with the decompressed extracted compressed network measurement data to produce extracted network measurement data.

15. The non-transitory machine-readable storage medium of claim 14, further comprising instructions for receiving, by the repository, the compressed network measurement data and the error metadata for a network object.

16. The non-transitory machine-readable storage medium of claim 14, further comprising instructions for compressing network measurement data and transmitting the compressed network measurement data to the repository.

17. The non-transitory machine-readable storage medium of claim 14, further comprising instructions for receiving, by a monitoring system, the error segment of raw network measurement data from a network object.

18. The non-transitory machine-readable storage medium of claim 17, further comprising instructions for detecting an error in the network measurement data and sending only the error segment of network measurement data to the monitoring system.

19. The non-transitory machine-readable storage medium of claim 18, wherein detecting the error includes filtering the network measurement data using thresholds.

20. The non-transitory machine-readable storage medium of claim of claim 14, further comprising:
   instructions for receiving a second query for network measurement data;
   instructions for extracting compressed network measurement data and error metadata from a repository database based upon the second query;
   instructions for decompressing the extracted compressed network measurement data from the second query;
   instructions for determining that the decompressed network measurement data from the second query has a specified accuracy; and
   instructions for outputting the decompressed network measurement data from the second query as the extracted network measurement data.

* * * * *